Dec. 12, 1950 G. CAHILL 2,533,350
JUICE EXTRACTION APPARATUS AND METHOD
Filed July 24, 1946 2 Sheets-Sheet 1
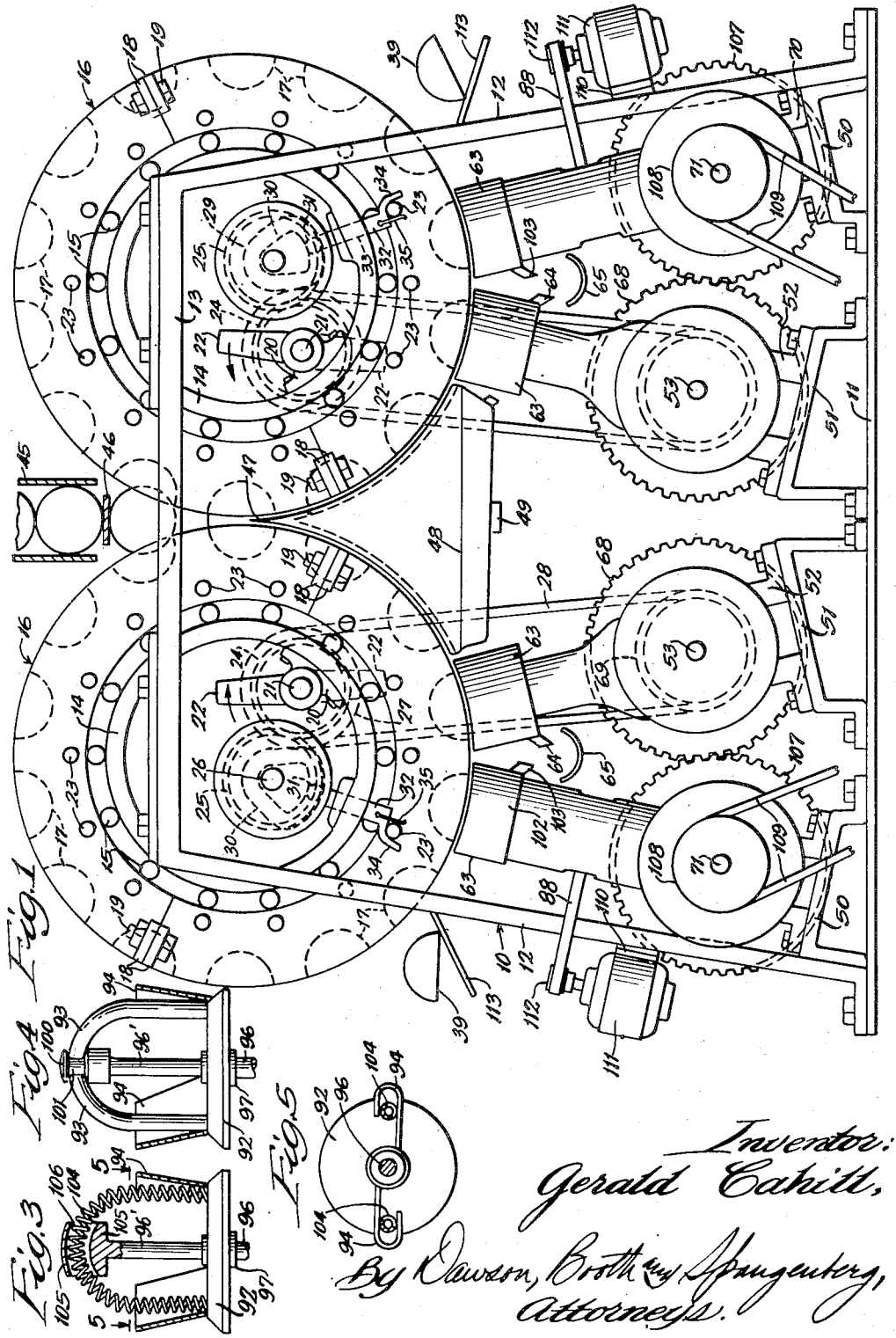
Inventor:
Gerald Cahill,
By Dawson, Booth and Spangenberg,
Attorneys.

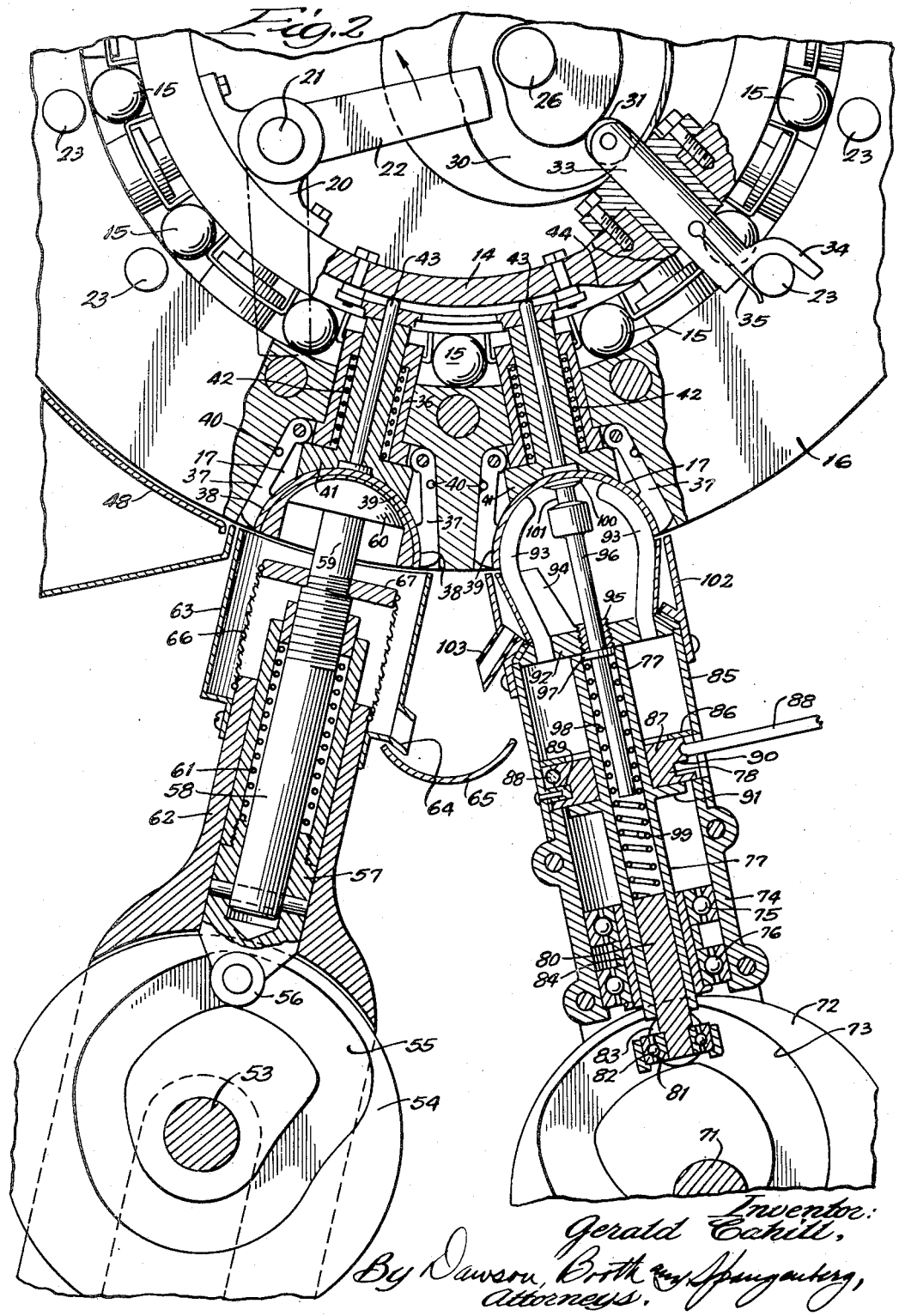

Patented Dec. 12, 1950

2,533,350

UNITED STATES PATENT OFFICE 2,533,350

JUICE EXTRACTION APPARATUS AND METHOD

Gerald Cahill, Vero Beach, Fla.

Application July 24, 1946, Serial No. 686,006

10 Claims. (Cl. 146—236)

This invention relates to juice extraction apparatus and the method. The invention is particularly applicable to the extraction of juice from citrus fruits.

In apparatus heretofore used, it has been common to press the juice from a divided citrus fruit, and it has also been common to use reamers for extracting juice by rotating the reamer within the half of the citrus fruit. Both methods have disadvantages in that when employed to extract all of the juice, they invariably draw a certain amount of rind oil, which is a very undesirable ingredient in the juice. The difficulty in extracting the juice of the citrus fruit without extracting rind oil is greatly enhanced because of the varying diameters of the fruit being processed. For example, oranges, grapefruit, etc., vary considerably in size, and a mechanical device intended to fit a medium size will usually not extract all of the juice from the large size, while with the smaller sizes it will cut into the rind and draw an unusual amount of rind oil. Further, the orange and grapefruit, etc., vary not only in size but also in thickness of the rind, and the problem of treating such fruit in such a manner as to remove all of the juice while excluding the rind oil has been unsolved up to this time.

An object of the invention is to provide apparatus and a method for the treatment of citrus fruit so as to remove substantially all of the juice while excluding entirely the rind oil. Yet another object is to provide apparatus which will receive citrus fruit, sever it, collect separately the juice recovered when severing and which contains rind oil, while at the same time providing mechanism for operating on each divided half of the fruit to form a depression therein, with a consequent part removal of juice, and to rotate within the depression a flexible element serving as a wiper to remove the last remaining juice cells within the fruit without drawing rind oil. Yet another object is to provide a method for extracting juice from the half of a citrus fruit by first pressing the same from a depression therein and rotating the flexible element therein to wipe off the remaining juice cells without extracting rind oil. Still a further object is to provide improved wiper means for removing the remainder of the juice within a citrus fruit half after the same has been partially pressed. A further object is to provide new apparatus for intermittently feeding citrus fruit through cutting apparatus, and thereafter through pressing and wiping mechanism for the removal of the juice. Other specific objects and advantages will appear as the specification proceeds.

The invention is illustrated, in a preferred embodiment, by the accompanying drawings, in which—

Figure 1 is a side view in elevation of apparatus embodying my invention; Fig. 2, an enlarged vertical sectional view showing the pressing and wiping mechanism; Fig. 3, a broken and part sectional view of a wiper device; Fig. 4, a view similar to Fig. 3 and showing the type of wiper device illustrated also in Fig. 2; and Fig. 5, a transverse sectional view, the section being taken at line 5—5 of the modified structure shown in Fig. 3.

In the illustration given, 10 designates a rigid frame carried by base plate 11. The frame comprises upright members 12 and horizontal top members 13.

Mounted upon the frame 10 is a pair of inner fixed cylindrical members 14. Mounted upon the fixed rings 14 are the races carrying the anti-friction balls 15. Mounted upon the anti-friction bearings 15 are the outer annular members or carriers 16. The carriers 16 are so supported as to have ther peripheries lie in close juxtaposition on one side, as indicated in Fig. 1. Each of the carriers 16 is provided with a series of pockets or recesses 17 adapted to receive half of an orange or grapefruit, etc. The carriers 16 are each preferably formed in two semicircular parts equipped with flanges 18, and when the parts are brought together around the anti-friction bearings, the flanges are secured together by bolts 19.

Any suitable means for rotating the carriers 16 may be employed. I prefer to employ means which will operate the carriers intermittently with pauses between each movement, and I prefer to support the rotating mechanism within the fixed ring or cylinder 14. Mounted upon the stationary ring 14 is a bracket member 20 which provides a bearing for the shaft 21. Fixed to the shaft 21 is a drive arm 22 which is adapted to engage one of the pins 23 carried by the annular carrier member 16 to advance the carrier a given distance. Shaft 21 is equipped with a gear 24 adapted to mesh with a gear 25 carried by an adjacent shaft 26. Shaft 21 is also equipped with a pulley sheave 27 receiving the drive belt 28.

The shaft 26 is also supported upon a fixed bracket carried by the inner stationary ring 14, and the gear 25 mounted thereon meshes with the gear 24 of shaft 21 so that shaft 26 rotates simultaneously with the shaft 21. The shaft 26 carries a cam member 29 having a cam groove 30 therein. Fitted within the cam groove 30 is a pin or roller 31 fixed to a plunger 32. The plunger 32 extends through a guide passage 33 in the fixed ring or cylinder 14, and at its outer end the plunger 32 is provided with an outwardly-flared finger 34. A spring blade 35 is spaced from the finger 34 and tends to flex when the plunger is moved outwardly into engagement with one of the pins 23, thus providing a sturdy grip upon the pin and preventing any back movement or rebound of the carrier 16.

Within each of the pockets or recesses 17 of the carrier 16 is mounted a frame member 36 equipped with a pair of hinged fingers 37, as shown more clearly in Fig. 2. The fingers 37 have arcuate portions 38 at their outer ends adapted to engage the rind 39 of the fruit half and to grip it while the fruit half is being carried by conveyor 16. The fingers are located in a ring and serve to enter the fruit within the pocket. In other words, the fruit is held within the radial center of the pocket by means of the fingers, and the centering is accomplished irrespective of the size or diameter of the fruit being processed. A spring 40 urges the fingers 37 normally in an inward direction.

A presser foot 41 normally engages the inner portion of the fruit rind 39 and is urged toward the fruit by a compression spring 42. An ejector plunger 43 is mounted within the member 41 and is adapted to be engaged by a cam 44 provided by the inner stationary ring 14, as shown more clearly in Fig. 2. When the plunger 43 engages the cam 44, it is moved downwardly to eject the fruit rind or half from the pocket 17.

Referring to Fig. 1, any suitable means for feeding oranges, grapefruit, or the like, to the carriers 16 may be provided. In the illustration given, I provide a chute 45 which is placed directly over the portions of the conveyor 16 where they approach each other, and a reciprocating blade 46 is provided for allowing the fruit to drop one at a time into the pockets 17.

Mounted between the carriers 16 is a cutting edge or knife 47, and below the knife 47 is a receptacle 48 equipped with a drain pipe 49. Since the knife in cutting through the rind of the citrus fruit draws a certain amount of rind oil, it is preferred to collect the juice at this point separately and not to mix it with the extracted juice containing no rind oil, which will be later referred to.

Any suitable means for extracting the juice from the severed halves of the citrus fruit may be employed. I prefer to use a two-step method or apparatus for accomplishing the extraction of the juice, the first step having to do with forming a depression in the exposed severed portion of the fruit, and the second step having to do with the rotating of a member, and preferably a flexible element, within the depression to wipe away the remainder of the juice within the divided fruit.

As shown best in Fig. 1, the base plate 11 carries the angular supporting plates 50 and 51. Upon plate 51 is supported a pressing mechanism. A bracket member 52 supports shaft 53 which carries a cam wheel 54 provided with a cam groove 55. A roller 56, as shown more clearly in Fig. 2, is mounted within the groove 55 and actuates a plunger 57. Supported within the plunger 57 is an inner plunger 58 having a reduced upper end 59 terminating in a presser head 60. The head 60 has a rounded upper surface adapted to advance and form a recess within the divided fruit 39, as shown best in Fig. 2. A spring 61 normally urges the inner plunger 58 upwardly, but is adapted to yield under pressure so as not to injure or break the rind of the fruit being processed. About the stationary frame structure 62 is supported a juice-receiving cup 63 having a spout 64. Below the spout 64 is a channel member 65 adapted to convey the juice received to a final receptacle. A screen 66 is suspended between the upper frame member 67 and the lower frame member 62 and serves to deflect the juice toward the side walls of the cup 63. The upper member or deflector 67 also causes the juice to flow toward the periphery of the cup 63.

The shaft 53 carries a gear 68 and also a pulley sheave 69. Thus, the rotation of shaft 53 results in the driving of the upper shaft 21 which produces the intermittent movement of the carrier 16 above.

I next provide means for entering the depression formed by the presser head 60 and for rotating therein to wipe away the remainder of the juice cells within the fruit half. Such a mechanism is carried by the supporting plate 50. Upon plate 50 is mounted a stationary frame member 70 and in which is mounted the shaft 71. Shaft 71, as shown more clearly in Fig. 2, is fixed to a cam wheel 72 having a cam groove 73. Above the stationary casing 70 extends a stationary casing 74 in which are mounted the anti-friction devices 75 and 76. A shaft 77 is rotatably mounted within said anti-friction devices and carries a pulley wheel 78 adapted to be driven by belt 79.

Slidably mounted within the shaft 77 is a plunger 80 having a lower reduced end 81 mounted within an anti-friction bearing 82. Fixed to the bearing 82 is a roller 83 received within the cam groove 73. Thus, the lower end 81 of shaft 80 may rotate freely within bearing 82 without interfering with the operation of the roller 83 in its raising and lowering of the plunger 80. The plunger or shaft 80 is slidably mounted within a tubular member 84 carried by the races of the anti-friction members 75 and 76.

Above the fixed casing 74 is a second casing member 85 having a fixed abutment 86 extending inwardly thereof. Freely mounted upon the shaft 77 adjacent the abutment 86 is a pulley 87 which is driven by a belt 88. The pulley 87 is secured in position by means of a roller 89 operating within an annular recess 90 with which the pulley 87 is provided.

Fixed to shaft 77 is a clutch member 91 which is adapted to be brought against the rotating pulley 87 when the shaft 77 is raised to the elevated position shown in Fig. 2, and thus causing the shaft 77 to rotate when in this elevated position.

Mounted upon shaft 77 is the head member 92 which carries in spaced-apart relation a pair of resilient wiping members 93, the wiping members 93 being guided within the guide members 94 for radial movement.

The head 92 is centrally apertured and provided with a threaded guide boss 95 receiving a plunger 96. The plunger 96 is provided with a stop collar 97 and then extends downwardly through a recess 98 in the shaft 77. A spring 99 in the recess normally urges the collar 97 towards raised position. The upper portion of shaft 96 is provided with a presser head 100 having an annular recess 101 into which the members 93 may flex when not being rotated, as shown more clearly in Fig. 4.

Surrounding the head 92 is a cup 102 provided on one side with a spout 103 for directing the recovered juice into the channel 65.

In the modification shown in Figs. 3 and 5, I provide a coil member 104 having its ends secured within the head 92. The shaft 96' is provided with a head member 105 having a recess 106 therein, receiving the coil 104. Guide members 94, similar to the guide members employed with the structure shown in Fig. 4, are employed to direct the wiper member 104 in a radial direction.

The wiper members 93, shown in Fig. 4, operate under centrifugal force and are thrown out to the position shown in Fig. 2 under the influence of centrifugal force. The modification shown in Figs. 3 and 5 operates to some extent under centrifugal force, but is also expanded radially by mechanical action. As the member 104 is raised by shaft 17, movement of the head member 105 is arrested, and the spring 99 yields to permit continued upward movement of shaft 77. This action compresses the top of the coil 104 downwardly and thus causes the side walls thereof to expand radially to fill the recess formed in the grapefruit or other citrus fruit.

The shaft 71 carries a gear 107 meshing with gear 68 of shaft 53. Thus, the shaft 71 will rotate together with shaft 53. The shaft 71 is provided with a pulley 108 driven by belt 109 leading to any suitable source of power.

A bracket 110 supports a motor 111 which drives a pulley 112 receiving the belt 88. By this means, the pulley 87 is maintained in constant rotation during the operation of the machine.

A slide 113 may be provided at the outside of each of the frame members 12 for directing the ejected rinds 39 toward a collector hopper (not shown).

In the illustration given, a single unit, comprising a pair of carriers 16 and the juice-extracting members cooperating therewith, is shown. It will be understood that the usual machine will comprise a number of such units and that common shafts will be provided for operating such units simultaneously.

It will also be understood that instead of supporting the presser member 60 and the rotary wiping members 93 in separate structures, the two may be combined in a single device for operation in the sequence already described.

Operation

In the operation of the unit structure shown, an orange or other citrus fruit is fed through chute 45 and allowed to fall into the aligned pockets 17 of the carriers 16. The carriers rotate inwardly and downwardly and carry the orange toward the cutting edge 47. Here the orange is divided and the juice resulting from such division falls into the receptacle 48, the receptacle 48 serving also to maintain the orange or other citrus fruit in position. In the division operation, the spring members 42 press outwardly so that even if a small orange is received within the pocket, it is equally spaced between the two carriers 16 and therefore evenly divided. The fingers 37 engage the divided fruit and hold the half in the position shown in Fig. 2.

Each carrier 16 is advanced intermittently by the rotation of shaft 21 and drive arm 22 which engages a pin 23 on carrier 16. After the arm has advanced the pin a distance, it slides away from the pin, as illustrated in Fig. 1, and at that moment the outwardly-moving plunger 32 engages one of the pins 23 and grips it against the spring 35, thus forming a tight engagement and preventing backlash or rebound. The shaft 21 is driven by the pulley belt 28 secured to the pulley carried by shaft 53, and continued movement of the belt 28 causes the drive arm 22 to move toward the next pin. At the same time, shaft 26, which is connected by gearing to shaft 21, rotates the cam 25 and withdraws the locking plunger 32 from engagement with the pin 23.

The divided fruit 39, as shown best in Fig. 2, is first engaged by the presser head 60, which is set for forming a depression within the smallest fruit being processed, while at the same time leaving an outer layer of juice cells unpressed. The fruit half 39 is then advanced to the next stage where the flexible elements 93 enter the recess within the fruit and are rotated therein so as to wipe away the last remaining juice cells. The flexible elements are expanded by centrifugal force, and under such force substantially fill the area within the orange or grapefruit, etc., so as to remove the last of the juice but without cutting into the rind. Often one or two rotations are found to be sufficient to wipe away the remainder of the juice cells.

Since pulley 87 rotates freely about shaft 77, it does not tend to turn the shaft while the roller 83 is in lower position. Thus, the flexible or resilient members 93 tend to assume the position shown in Fig. 4 and readily enter the recess formed in the orange or other citrus fruit when the shaft 77 is being raised by cam wheel 72. When, however, the clutch flange 91 of shaft 77 engages the pulley 87 in the upward movement of shaft 77, the rotating pulley thus becomes connected to shaft 77 and causes the shaft and head 92 to rotate. This movement throws the wiper elements 93 outwardly to occupy the position illustrated in Fig. 2. In this operation, the flexible elements 93 remove the last remaining juice cells within the citrus fruit, and as the shaft 77 starts downwardly and is freed from engagement with pulley 87, the members 93 swing backwardly toward the position illustrated in Fig. 4. The final engagement of head 92 with the abutment 86 of fixed casing 85 stops any final rotation of head 92 if the same should be rotating. The head is now ready for the return stroke, with the resilient members 93 swung inwardly to the position illustrated in Fig. 4.

The members 93 are preferably formed of a resilient material, such as rubber, and are so molded as to tend normally to assume the position illustrated in Fig. 4. They swing outwardly only under centrifugal force.

In the operation of the modified structure shown in Figs. 3 and 5, the coil spring tends to assume normally the position shown in Fig. 3. Upon rotation of the head 92, the coil tends to swing outwardly under centrifugal force, but there is also a further mechanical action which tends to force it toward expanded position. Pressure on head 105 causes its arrest while shaft 77 continues its upper movement, thus causing spring 98 to absorb the pressure in the continued upward movement of shaft 17, causing the resilient member 104 to assume the form of the interior of the orange. Thus, there is mechanical expansion as well as centrifugal expansion in the operation of the wiper element 104.

As the carrier 16 is moved on to the next position after being engaged by the rotary members 93, the ejector plunger is actuated by the cam 44 and the rind is discharged along slide 113.

The collected juice flowing from cups 63 and 102 and received within channels 65 contains no rind oil and represents all of the juice within the fruit being processed except the rejected juice containing rind oil flowing through drain pipe 49.

While in the foregoing specification, I have set forth a single embodiment of the invention and have described it in considerable detail for the purpose of illustration, it will be understood that such details may be varied widely by those skilled in the art without departing from the spirit of my invention.

I claim:
1. In apparatus for extracting juice from divided citrus fruit portions and equipped with means for supporting the divided fruit portion, means for pressing against the fruit meat to form a depression therein and to remove a major portion of the juice, means for moving the divided fruit portion containing said depression to a second station, and a flexible rotary wiper adapted to be moved within said depression, and means for rotating said wiper within said depression to remove substantially the remainder of said juice.

2. In apparatus for extracting juice from divided citrus fruit portions and equipped with means for supporting the divided fruit portion, means for pressing against the fruit meat to form a depression therein and to remove a major portion of the juice, a flexible rotary wiper adapted to be moved within said depression in contracted form, and means for expanding and rotating said flexible wiper within said depression to remove substantially the remainder of said juice.

3. In apparatus for extracting juice from divided citrus fruit portions and equipped with means for supporting a divided fruit portion, means for pressing against the fruit meat to remove a major portion of the juice therefrom and to form a depression therein, a rotatably-mounted wiper member, means for moving said wiper member in contracted form into said depression and for rotating the same therein, and means for expanding said wiper member within said depression after said wiper is within said depression.

4. In apparatus for extracting fruit juice from a fruit half and equipped with means for supporting the half with the severed side exposed, a pressure arm for successively forming a depression within the meat of said fruit and means for introducing a separate flexible wiper member in contracted form within said depression, for rotating said wiper member to expand the same within said previously formed depression.

5. In apparatus for extracting juice from divided citrus fruit portions and equipped with means for supporting a divided fruit portion, means for advancing a presser member against the fruit meat to remove a major portion of the juice therefrom and to form a depression therein, means for advancing a separate expansible wiper member in contracted form within said depression and rotating the same therein, and means for expanding the member within said depression after it enters said depression to wipe the remainder of the juice from said fruit portion.

6. In apparatus for extracting juice from a citrus fruit half, in which means are provided for supporting the half, means for pressing against the fruit meat to form a depression therein less than the width of the meat portion of the fruit, a flexible wiper member, means for moving said wiper member into the depression so formed, means for expanding said wiper member within said depression after the same has entered said depression, and means for rotating said wiper member to remove juice from the portion of the fruit meat about said initial depression.

7. In apparatus for extracting juice from a citrus fruit half and having means for supporting said fruit half, means for pressing against the fruit meat to form a depression therein less than the area of the fruit meat, an expansible wiper equipped with a head, means for projecting said wiper and head within said depression to bring said head into engagement with said fruit half and to expand said wiper, and means for rotating said wiper within said depression.

8. In apparatus for extracting juice from a citrus fruit half, in which apparatus means are provided for supporting said fruit half, means for pressing against the fruit meat to form a depression therein less than the width of the fruit meat, a rotatably-mounted expansible wiper member equipped with a head, means for pressing said head against the fruit half, means associated with said head for expanding said wiper member when the head engages said fruit half, and means for rotating said expanded wiper member.

9. In a process for extracting juice from a citrus fruit half, the steps of first forming a depression centrally within the fruit half less than the width of the fruit and leaving juice cells adjacent the rind of the fruit uncrushed, entering the depression without contacting said uncrushed juice cells and then rubbing the juice cells along a circular path to remove the juice from said remaining cells.

10. In a process for extracting juice from a citrus fruit half, the steps of first forming a depression centrally within the fruit half less than the width of the fruit and leaving juice cells adjacent the rind of the fruit uncrushed, entering the depression without contacting said uncrushed juice cells and then rubbing the juice cells along a circular path and with gradually increasing pressure.

GERALD CAHILL.

REFERENCES CITED

The following references are of record in the file of this patent:

UNITED STATES PATENTS

| Number | Name | Date |
| --- | --- | --- |
| 1,834,097 | Gum | Dec. 1, 1931 |
| 2,353,841 | McKinnis | July 18, 1944 |
| 2,354,721 | Walker | Aug. 1, 1944 |